United States Patent
Ohtsuji et al.

(10) Patent No.: US 11,012,821 B2
(45) Date of Patent: May 18, 2021

(54) RADIO TERMINAL APPARATUS AND METHOD THEREFOR

(71) Applicant: NEC Corporation, Tokyo (JP)

(72) Inventors: Taichi Ohtsuji, Tokyo (JP); Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 27 days.

(21) Appl. No.: 16/606,307

(22) PCT Filed: Jan. 18, 2018

(86) PCT No.: PCT/JP2018/001383
§ 371 (c)(1),
(2) Date: Oct. 18, 2019

(87) PCT Pub. No.: WO2018/198446
PCT Pub. Date: Nov. 1, 2018

(65) Prior Publication Data
US 2021/0105584 A1    Apr. 8, 2021

(30) Foreign Application Priority Data

Apr. 26, 2017    (JP) .............................. JP2017-086989

(51) Int. Cl.
*H04W 4/06*    (2009.01)
*H04W 88/04*    (2009.01)
(Continued)

(52) U.S. Cl.
CPC ............... *H04W 4/06* (2013.01); *H04W 4/70* (2018.02); *H04W 24/10* (2013.01); *H04W 88/04* (2013.01)

(58) Field of Classification Search
CPC ......... H04W 84/18; H04W 4/70; H04W 4/06; H04W 56/001; H04W 24/10;
(Continued)

(56) References Cited

U.S. PATENT DOCUMENTS 9,198,078 B1 * 11/2015 Vivanco ............ H04W 28/0289
10,264,557 B2    4/2019 Adachi
(Continued)

FOREIGN PATENT DOCUMENTS

JP    2001-217848 A    8/2001
JP    2006-304067 A    11/2006
(Continued)

OTHER PUBLICATIONS

International Search Report in International Application No. PCT/JP2018/001383, dated Apr. 17, 2018.
(Continued)

*Primary Examiner* — Kwasi Karikari

(57) ABSTRACT

Radio terminals (1A, 1B, 1C) each receive a broadcast/multicast signal (220) from a cellular communication network (10). The representative terminal (1A) receives response messages from the respective neighboring radio terminals (1B, 1C) via D2D communication (231, 232). Each response message is generated based on reception of the broadcast/multicast signal (220) by each neighboring radio terminal (1B, 1C). The representative terminal (1A) generates a representative response message and transmits it to the cellular communication network (10) or another node (7) via uplink transmission (240). It is thus, for example, possible to contribute to improving efficiency of transmission by radio terminals of response messages related to a broadcast/multicast service.

8 Claims, 10 Drawing Sheets

(51) Int. Cl.
*H04W 24/10* (2009.01)
*H04W 4/70* (2018.01)

(58) Field of Classification Search
CPC ....... H04W 48/16; H04W 4/40; H04W 72/04; H04W 72/042; H04W 72/14; H04W 84/20; H04W 36/0022; H04W 48/10; H04W 52/242; H04W 76/15; H04W 8/005; H04W 8/22; H04W 12/009; H04W 16/14; H04W 4/08; H04W 52/245; H04W 52/48; H04W 52/50; H04W 56/00; H04W 56/0015; H04W 56/002; H04W 84/047; H04W 88/02; H04W 88/04; H04W 92/18
See application file for complete search history.

(56) References Cited

U.S. PATENT DOCUMENTS

| | | | |
|---|---|---|---|
| 2001/0014088 A1 | 8/2001 | Johnson et al. | |
| 2008/0181159 A1* | 7/2008 | Metzler | H04L 47/10 370/312 |
| 2012/0127994 A1* | 5/2012 | Ko | H04L 12/18 370/390 |
| 2015/0237466 A1* | 8/2015 | Kawaguchi | H04W 4/08 455/456.3 |
| 2017/0273064 A1 | 9/2017 | Adachi | |
| 2017/0325277 A1 | 11/2017 | Fujishiro et al. | |
| 2018/0249361 A1 | 8/2018 | Otsuki et al. | |

FOREIGN PATENT DOCUMENTS

| | | |
|---|---|---|
| JP | 2007-251475 A | 9/2007 |
| JP | 2007-288259 A | 11/2007 |
| JP | 2009-246419 A | 10/2009 |
| JP | 2015-220550 A | 12/2015 |
| JP | WO2016/047671 A1 | 3/2016 |
| WO | 2017/121567 A1 | 8/2016 |
| WO | 2017/037845 A1 | 3/2017 |

OTHER PUBLICATIONS

"3rd Generation Partnership Project; Technical Specification Group Services and System Aspects; Group Communication System Enablers for LTE(GCSE_LTE); Stage 2 (Release 13)", 3GPP TS 23.468 V13.3.0, Dec. 2015, Valbonne, France, pp. 1-30 (30 pages total).
Japanese Office Action for JP Application No. 2019-515093 dated Dec. 8, 2020 with English Translation.

* cited by examiner

RADIO TERMINAL APPARATUS AND METHOD THEREFOR

This application is a National Stage Entry of PCT/JP2018/001383 filed on Jan. 18, 2018, which claims priority from Japanese Patent Application 2017-086989 filed on Apr. 26, 2017, the contents of all of which are incorporated herein by reference, in their entirety.

TECHNICAL FIELD

The present disclosure relates to broadcast/multicast services provided in cellular communication networks, and in particular to transmission of response messages related to the broadcast/multicast services by radio terminals.

BACKGROUND ART

Using a Long Term Evolution (LTE) network for a public safety network (PSN) has been discussed. The public safety network is a radio communication network used for emergency services such as police, firefighting, and a medical emergency. An LTE system for the public safety network is referred to as a Public Safety LTE (PS-LTE).

Group communication is one of the main services required by public safety networks. The Third Generation Partnership Project (3GPP) has already introduced Multimedia Broadcast Multicast Service (MBMS) to enable the group communication. Accordingly, it is assumed that MBMS and its enhancements are used for providing the group communication in PS-LTE.

Specifically, Group Communication Service Application Server (GCS AS) is used to provide the group communication. The architecture of the group communication including the GCS AS is specified in Non Patent Literature 1. The GCS AS is an entity in the application domain and communicates with PS devices (i.e., User Equipments (UEs)) in the application layer. The GCS AS provides one-to-one communication and one-to-many communication.

The GCS AS can use a MBMS bearer service to transfer application signaling and deliver application data to a group of UEs. The GCS AS can instead use Evolved Packet System (EPS) bearer services to transfer application signaling and deliver application data to a group of UEs or can use both the MBMS bearer service and EPS bearer services. That is, the GCS AS selects whether to use UE-dedicated unicast bearer services (i.e., EPS bearer services), a multicast bearer service (MBMS bearer service), or both, in order to deliver application signaling or data to a group of UEs. Each EPS bearer service is provided to a respective UE by a Serving Gateway (S-GW) and a Packet Data Network (PDN) Gateway (P-GW) through a radio access network (i.e., Evolved Universal Terrestrial Radio Access Network (E-UTRAN) including a base station (eNB)). The MBMS bearer service is provided to a group of UEs by a Broadcast Multicast Service Center (BM-SC) and an MBMS Gateway (MBMS GW) through the E-UTRAN.

CITATION LIST

Non Patent Literature

Patent Literature 1: 3GPP TS 23.468 V13.3.0 (2015-12) "3rd Generation Partnership Project; Technical Specification Group Services and System Aspects; Group Communication System Enablers for LTE (GCSE LTE); Stage 2 (Release 13)", December 2015

PATENT LITERATURE

Patent Literature 1: International Patent Publication No. WO 2016/121567
Patent Literature 2: International Patent Publication No. WO 2017/037845

SUMMARY OF INVENTION

Technical Problem

The inventors have studied efficient delivery of response messages transmitted by radio terminals regarding broadcast/multicast services (e.g., MBMS). The response message can be referred to as a feedback or broadcast/multicast-related information. The response message is associated with a broadcast/multicast service. The radio terminal receives a broadcast/multicast signal via downlink reception from a cellular communication network and generates a response message (or a feedback, or broadcast/multicast-related information) based on reception of the broadcast/multicast signal. The radio terminal transmits the generated response message to the cellular communication network or a server (e.g., GCS AS) via uplink transmission to the cellular communication network.

For example, as shown in Patent Literature 1, the radio terminal may receive a broadcast/multicast signal from a cellular communication network and report a response message indicating a downlink received signal quality (e.g., RSRP or RSRQ) to the cellular communication network. As an example, when the downlink received signal quality is lower than a predetermined threshold, the radio terminal transmits a response message (feedback) to the cellular communication network.

However, considering the use of a broadcast/multicast service in a public safety network (e.g., PS-LTE network), it is likely that there will be a lot of radio terminals that can only enjoy a downlink received signal quality below the threshold. It might be undesirable to use a lot of uplink radio resources of the public safety network to transmit response messages (feedbacks) from a lot of radio terminals.

Patent Literature 2 discloses that radio terminals perform device-to-device (D2D) communications with each other and elect one representative terminal from among them, and that only the representative terminal performs measurement, logging and reporting for Minimization of Drive Tests (MDT). By doing so, the radio terminals other than the representative terminal are exempted from the measurement, logging and reporting for MDT. However, nowhere does Patent Literature 2 disclose anything about broadcast/multicast services. Furthermore, according to the technique disclosed in Patent Literature 2, the radio terminals other than the representative terminal are exempted from the measurement, logging and reporting of their downlink received signal qualities. Thus, Patent Literature 2 does not suggest, for example, that the representative terminal receives measurement information (e.g., received signal quality) from another radio terminal and reports it to the network on behalf of the other radio terminal.

One object to be attained by the embodiments disclosed herein is to provide an apparatus, a method, and a program that contribute to improving efficiency in transmission by radio terminals of response messages related to a broadcast/multicast service. It should be noted that this object is merely one of the objects to be attained by the embodiments disclosed herein. Other objects or problems and novel features will become apparent from the following description and the accompanying drawings.

Solution to Problem

In a first aspect, a radio terminal apparatus includes at least one radio transceiver and at least one processor. The at least one processor is configured to receive a broadcast/multicast signal via downlink reception from a cellular communication network by means of the at least one radio transceiver. The broadcast/multicast signal is transmitted from the cellular communication network. The at least one processor is configured to receive at least one response message via device-to-device (D2D) communication by means of the at least one radio transceiver. The at least one response message is transmitted by at least one respective neighboring radio terminal based on reception of the broadcast/multicast signal by the at least one neighboring radio terminal. The at least one processor is configured to generate a representative response message based on both a result of receiving the broadcast/multicast signal and a result of receiving the at least one response message via the at least one radio transceiver. Further, the at least one processor is configured to transmit the representative response message to the cellular communication network or another node, via uplink transmission to the cellular communication network by means of the at least one radio transceiver.

In a second aspect, a method performed by a radio terminal apparatus includes:
(a) receiving a broadcast/multicast signal via downlink reception from a cellular communication network by means of at least one radio transceiver of the radio terminal apparatus, the broadcast/multicast signal being transmitted from the cellular communication network;
(b) receiving at least one response message via device-to-device (D2D) communication by means of the at least one radio transceiver, the at least one response message being transmitted from at least one respective neighboring radio terminal based on reception of the broadcast/multicast signal by the at least one neighboring radio terminal;
(c) generating a representative response message based on both a result of receiving the broadcast/multicast signal and a result of receiving the at least one response message via the at least one radio transceiver; and
(d) transmitting the representative response message to the cellular communication network or another node via uplink transmission to the cellular communication network by means of the at least one radio transceiver.

In a third aspect, a radio terminal apparatus includes at least one radio transceiver and at least one processor. The at least one processor is configured to receive a broadcast/multicast signal via downlink reception from a cellular communication network by means of the at least one radio transceiver. The broadcast/multicast signal is transmitted from the cellular communication network. The at least one processor is configured to generate a response message based on reception of the broadcast/multicast signal. Further, the at least one processor is configured to transmit a device-to-device (D2D) signal, containing the response message, to at least one neighboring radio terminal via D2D communication by means of the at least one radio transceiver.

In a fourth aspect, a method performed by a radio terminal apparatus includes:
(a) receiving a broadcast/multicast signal via downlink reception from a cellular communication network by means of at least one radio transceiver of the radio terminal apparatus, the broadcast/multicast signal being transmitted from the cellular communication network;
(b) generating a response message based on reception of the broadcast/multicast signal; and
(c) transmitting a device-to-device (D2D) signal containing the response message to at least one neighboring radio terminal via D2D communication by means of the at least one radio transceiver.

In a fifth aspect, a program includes instructions (software codes) that, when loaded into a computer, cause the computer to perform the method according to one of the above-described second and fourth aspects.

Advantageous Effects of Invention

According to the above aspects, it is possible to provide an apparatus, a method, and a program that contribute to improving efficiency in transmission by radio terminals of response messages related to a broadcast/multicast service.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

First Embodiment

Figure 1:
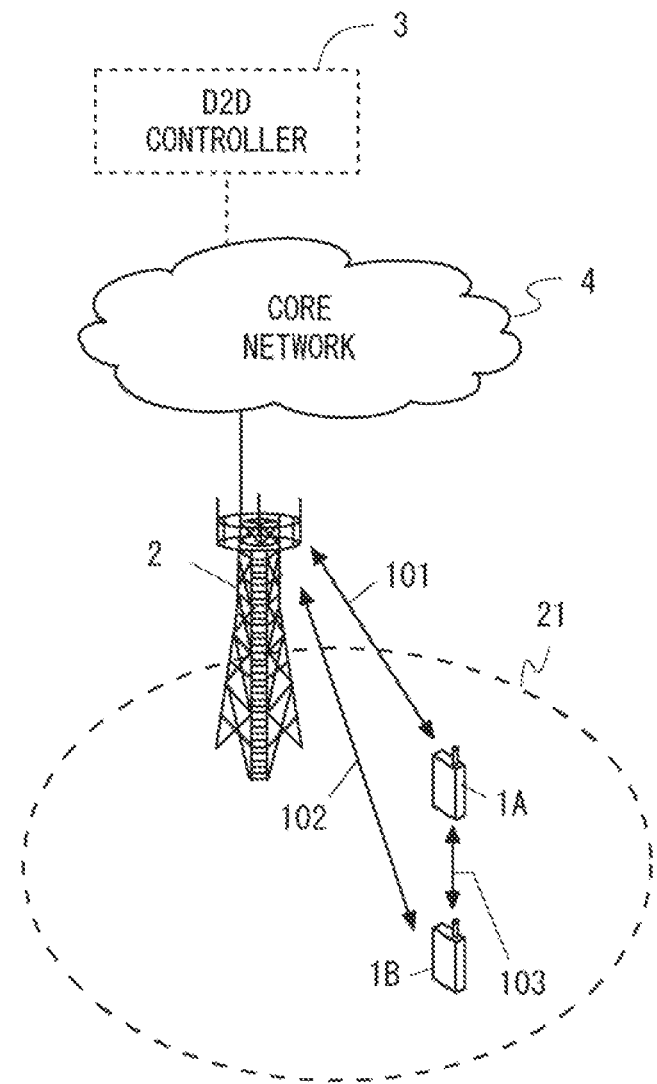
FIG. 1 is a diagram showing a configuration example of a radio communication network according to an embodiment.

FIG. 1 shows a configuration example of a radio communication network according to a plurality of embodiments including this embodiment. Radio terminals (e.g., LTE UE) 1A and 1B each include at least one radio transceiver and are configured to perform cellular communication (101 or 102)

with a base station (e.g., LTE eNodeB (eNB)) 2 and also perform D2D communication on an inter-terminal direct interface 103.

The D2D communication means a scheme in which a radio terminal communicates directly with another radio terminal not via an infrastructure network such as a base station. The D2D communication includes one or both of Direct Communication and Direct Discovery. In some implementations, a plurality of radio terminals supporting the D2D communication form a D2D communication group autonomously or in accordance with a network instruction and communicate with another radio terminals in the D2D communication group.

Proximity-based services (ProSe) specified in the Third Generation Partnership Project (3GPP) Releases 12 and 13 are examples of the D2D communication. ProSe Direct Discovery is performed through a procedure in which a radio terminal capable of performing ProSe (i.e., ProSe-enabled User Equipment (UE)) detects another ProSe-enabled UE by using only the capability of a radio communication technology (e.g., Evolved Universal Terrestrial Radio Access (E-UTRA) technology) possessed by these two UEs. ProSe direct discovery may be performed by three or more ProSe-enabled UEs.

ProSe direct communication enables establishment of a communication path between two or more ProSe-enabled UEs existing in a direct communication range, for example, after the ProSe direct discovery procedure. In other words, ProSe direct communication enables a ProSe-enabled UE to directly communicate with another ProSe-enabled UE, without communicating through a Public Land Mobile Network (PLMN) including an eNB. ProSe direct communication may be performed by using a radio communication technology that is also used to access an eNB (i.e., Evolved Universal Terrestrial Radio Access (E-UTRA) technology) or by using a Wireless Local Area Network (WLAN) radio technology (i.e., IEEE 802.11 radio technology).

In 3GPP Releases 12 and 13, a radio link between radio terminals (UEs) used for direct communication or direct discovery is referred to as a Sidelink. Sidelink transmission uses the Long Term Evolution (LTE) frame structure defined for an uplink and a downlink and uses a subset of uplink resources in frequency and time domains. A radio terminal (i.e., UE) performs sidelink transmission by using Single Carrier FDMA (Frequency Division Multiple Access) (SC-FDMA), which is also used in the uplink.

The base station 2 is an entity arranged in a radio access network within a cellular communication network (or PLMN). The radio access network is, for example, an LTE E-UTRA Network (E-UTRAN). The base station 2 is configured to provide cellular coverage 21 containing one or more cells and to perform cellular communication with each radio terminal 1 by means of a cellular communication technology (e.g., E-UTRA technology).

A core network 4 includes a plurality of user plane entities and a plurality of control plane entities. The user plane entities relay user data of the radio terminals 1A and 1B between the radio access network, which includes the base station 2, and an external network. The control plane entities perform various types of control for the radio terminals 1A and 1B including mobility management, session management (bearer management), subscriber information management, and charging management. The core network 4 is, for example, an LTE Evolved Packet Core (EPC). When the core network 4 is an EPC, the user plane entities include a Serving Gateway (S-GW) and a Packet Data Network Gateway (P-GW), while the control plane entities include a Mobility Management Entity (MME) and a Home Subscriber Server (HSS).

In some implementations, the radio terminals 1A and 1B may be configured to communicate with a D2D controller 3 through the base station 2 and the core network 4 to use proximity-based services (e.g., 3GPP ProSe). For example, in the case of 3GPP ProSe, the D2D controller 3 is equivalent to a ProSe function entity. For example, the radio terminals 1A and 1B may use network-level discovery (e.g., EPC-level ProSe Discovery) provided by the D2D controller 3, receive from the D2D controller 3 a message indicating a permission for the radio terminals 1A and 1B to start (or activate) D2D communication (e.g., ProSe Direct Discovery or ProSe Direct Communication), or receive from the D2D controller 3 configuration information regarding D2D communication in the cellular coverage 21.

Figure 2:
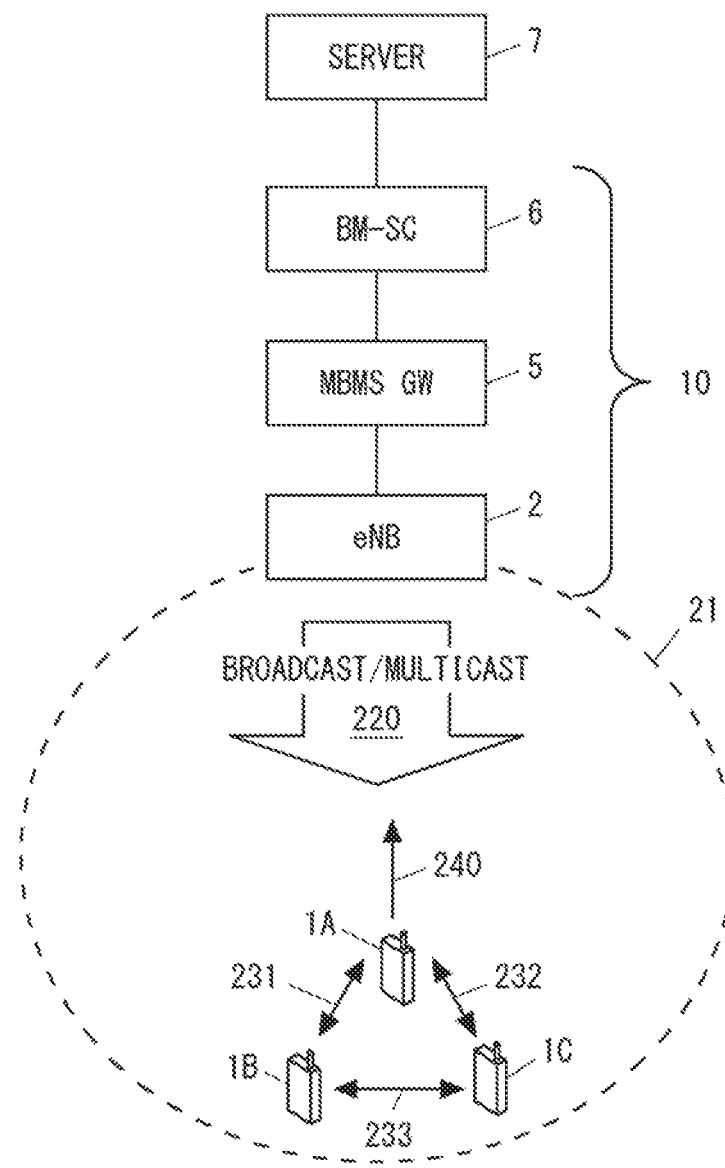
FIG. 2 is a diagram showing a configuration example of a radio communication network according to an embodiment.

Next, an operation of transmitting response messages related to a broadcast/multicast service by the radio terminals 2 will be described with reference to FIGS. 2 to 4. FIG. 2 shows a configuration example of a network when MBMS is used for PS-LTE. In the example of FIG. 2, a cellular communication network 10 includes a base station (eNB) 2, an MBMS GW 5, and a BM-SC 6. A server (e.g., GCS AS) 7 uses a MBMS bearer service provided by the cellular communication network 10 to transfer application signaling and to deliver application data to a group of UEs including radio terminals (UEs) 1A, 1B, and 1C.

The radio terminals (UEs) 1A, 1B, and 1C each receive a broadcast/multicast signal 220 via downlink reception from the cellular communication network 10. In an example using MBMS, a broadcast/multicast signal may be a downlink radio channel for transmitting a data radio bearer carrying MBMS data, i.e., a MBMS Radio Bearer (MRB) or Point-to-Multipoint (PTM) Radio Bearer. Transmission schemes for MBMS include a Multicast Broadcast Single Frequency Network (MBSFN) and a Single Cell Point to Multi-point (SC-PTM). In the MBSFN scheme, an MRB (or PTM bearer) is transmitted using a Multicast Channel (MCH) and a Physical Multicast Channel (PMCH). On the other hand, in the SC-PTM, an MRB (or PTM bearer) is transmitted using a Downlink Shared Channel (DL-SCH) and a Physical Downlink Shared Channel (PDSCH).

In the following description, when matters common to a plurality of radio terminals (UEs) including the radio terminals (UEs) 1A, 1B, and 1C are described, they are simply referred to as the "radio terminal (UE) 1" using the reference sign "1". Each radio terminal 1 generates a response message related to a broadcast/multicast service. As described above, a response message can be referred to as a feedback or broadcast/multicast-related information. A response message is associated with a broadcast/multicast service.

In an example using MBMS, a response message generated by each radio terminal (UE) 1 may indicate a downlink received signal quality. To be specific, each radio terminal 1 may measure a received signal quality of a downlink signal (e.g., broadcast/multicast signal 220, predetermined reference signal) transmitted from the base station 2. The downlink received signal quality may be, for example, Reference Signal Received Power (RSRP) or Reference Signal Received Quality (RSRQ). Additionally or alternatively, the downlink received signal quality may be a Signal to Interference plus Noise Ratio (SINR) regarding the broadcast/multicast signal or may be a Channel Quality Indicator (CQI) based on the SINR.

Furthermore, each radio terminal 1 transmits a D2D signal containing the response message generated by itself to its neighboring radio terminals 1 via D2D communication. In other words, each radio terminal 1 exchanges D2D signals each containing response messages with neighboring radio terminals (UEs) 1 (231, 232, and 233).

In some implementations, a D2D signal containing a response message may be a signal transmitted in a discovery procedure for discovering a neighboring radio terminal. In accordance with a so-called announcement model (model A), the radio terminal 1 operating as an announcing UE may transmit (broadcast) a discovery signal containing a response message. Other radio terminals 1 operating as monitoring UEs may receive the response message from the announcing UE by receiving the discovery signal from the announcing UE.

Alternatively, in accordance with a so-called solicitation/response model (model B), the UE 1 operating as a discoveree UE may transmit a response signal (response message) containing a response message. Another radio terminal 1 operating as a discoverer UE may receive the response message from the discoveree UE by receiving the response message from the discoveree UE.

The radio terminals 1A, 1B, and 1C elect from among them a representative terminal that represents these radio terminals. Here, it is assumed that the radio terminal 1A is the representative terminal. The representative terminal 1A generates a representative response message based on both a reception result by itself on the broadcast/multicast signal 220 and a reception result of the response messages from the other radio terminals 1B and 1C. Then, the representative terminal 1A transmits the generated representative response message to the cellular communication network 10 or another node (e.g., the server 7), via uplink transmission 240 to the cellular communication network 10. That is, the representative terminal 1A transmits the representative response message on behalf of at least one neighboring radio terminal (radio terminals 1B and 1C).

In some implementations, a response message generated by each radio terminal 1 may indicate a received signal quality of the broadcast/multicast signal 220 or another predetermined downlink signal (e.g., reference signal) at the radio terminal 1. In this case, a representative response message may indicate at least one statistical value obtained from the received signal qualities measured by the plurality of radio terminals 1. The at least one statistical value contained in the representative response message may include at least one of: a minimum value; a maximum value; an average value; or a variance value.

More specifically, the at least one statistical value contained in the representative response message may include at least a minimum value of the measured values of the downlink received signal quality obtained by the plurality of radio terminals 1. For example, the server (e.g., GCS AS) 7 can determine whether to use the broadcast/multicast transmission (e.g., MBMS bearer service) or the unicast transmission (e.g., EPS bearer services) to transmit data to the group of these radio terminals 1, based on the reported minimum value of the downlink received signal quality. Additionally or alternatively, for example, the base station 2 can determine transmission control (e.g., modulation and coding scheme (MCS) control, transmission power control) for the broadcast/multicast signal, based on the reported minimum value of the downlink received signal quality.

The representative response message may indicate the number of radio terminals 1 in a terminal group represented by the representative terminal 1.

The representative response message may contain all measured values of the downlink received signal quality measured by the plurality of radio terminals 1. In other words, the representative response message may contain all the response messages generated by the representative terminal 1A and the other radio terminals 1B and 1C. For example, the server (e.g., GCS AS) 7 can refer to the measured values obtained by the respective radio terminals 1 and can select a transmission method (e.g., broadcast/multicast transmission or unicast transmission) for each radio terminal 1 suitable for its radio state.

Figure 3:
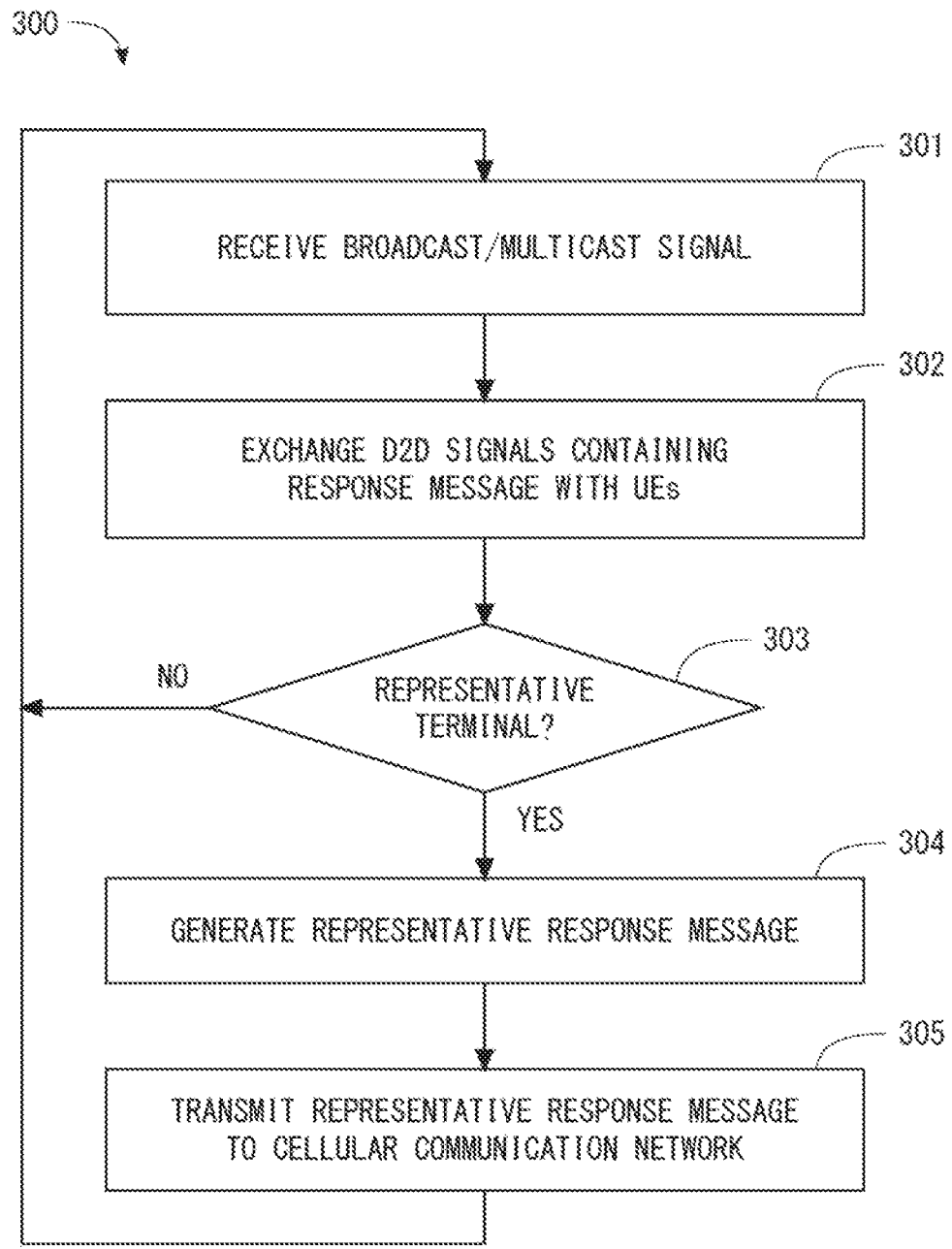
FIG. 3 is a flowchart showing an example of an operation of a radio terminal according to an embodiment.

FIG. 3 is a flowchart showing a process 300 that is an example of an operation of the radio terminal 1 according to this embodiment. In Step 301, the radio terminal 1 receives a broadcast/multicast signal transmitted from the cellular communication network 10. The broadcast/multicast signal is related to a broadcast/multicast service. In Step 302, the radio terminal 1 generates a response message related to the broadcast/multicast service and exchanges D2D signals each containing the response message with neighboring radio terminals (UEs).

In Step 303, the radio terminal 1 determines whether it is a representative terminal. If the radio terminal 1 is the representative terminal, the radio terminal 1 generates a representative response message and transmits this representative response message to the cellular communication network 10 (Steps 304 and 305).

Figure 4:
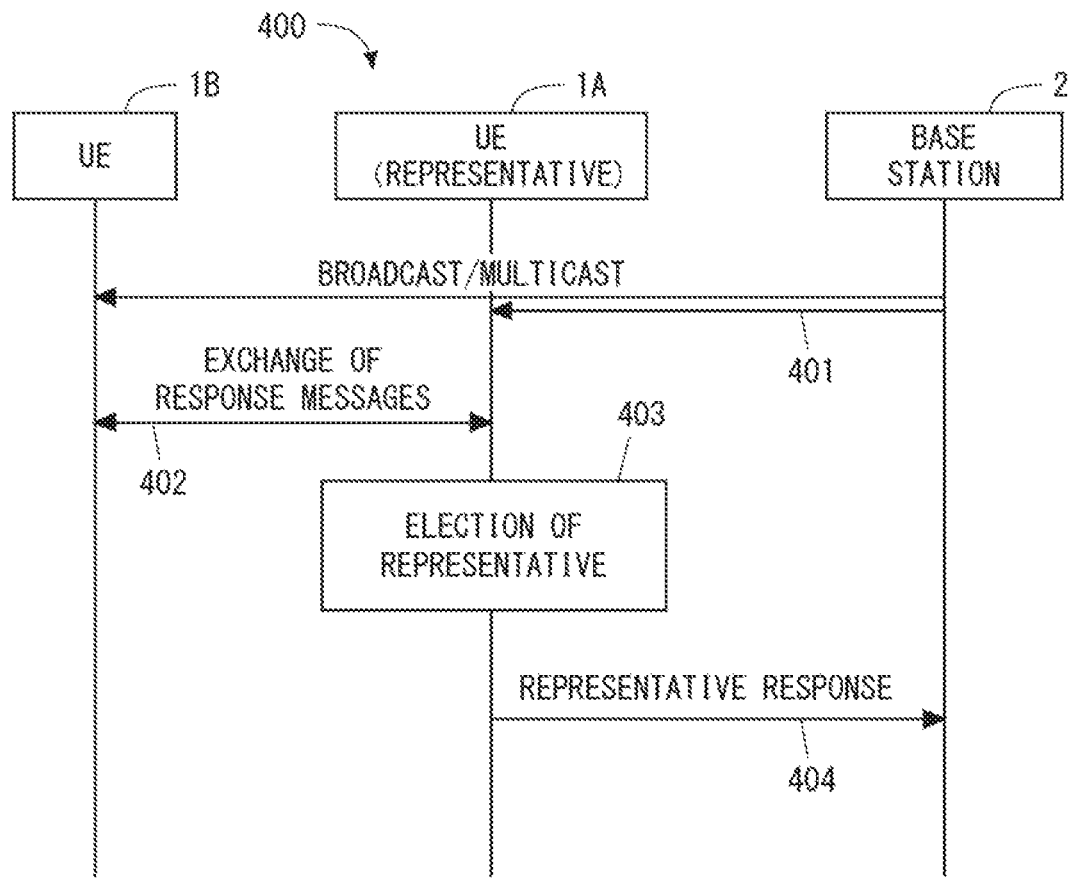
FIG. 4 is a sequence diagram showing an example of an operation of a radio terminal according to an embodiment.

FIG. 4 is a sequence diagram showing a process 400 that is an example of an operation for transmitting a representative response message according to this embodiment. In Step 401, the base station 2 transmits a broadcast/multicast signal in the cellular coverage 21. The radio terminals (UE) 1A and 1B receive this broadcast/multicast signal. In Step 402, the radio terminals 1A and 1B exchange response messages with each other via D2D communication. To be specific, the radio terminal 1A generates a response message based on its reception of the broadcast/multicast signal and sends it to the radio terminal 1B. Likewise, the radio terminal 1B generates a response message based on its reception of the broadcast/multicast signal and sends it to the radio terminal 1A.

In Step 403, the radio terminal 1A is elected as a representative terminal. In Step 404, the radio terminal 1A, i.e., the representative terminal, transmits a representative response message to the base station 2 or to another node (e.g., server 7) via the base station 2.

According to the above operations described with reference to FIGS. 2 to 4, although the radio terminals 1 each generate a response message related to a broadcast/multicast service, these response messages are only transmitted in D2D transmission among the radio terminals 1. Then, only a representative response message generated based on the response messages of the radio terminals 1 is transmitted in uplink to the cellular communication network 10 by the representative terminal 1A. Thus, the operations described with reference to FIGS. 2 to 4 enable avoiding a situation where a lot of uplink radio resources of the cellular communication network 10 are used by a lot of radio terminals 1 to transmit their response messages (feedbacks).

Second Embodiment

This embodiment provides a specific example of a procedure for generating a representative response message by a representative terminal. Configuration examples of a radio communication network according to this embodiment are similar to those shown in FIGS. 1 and 2.

Figure 5:
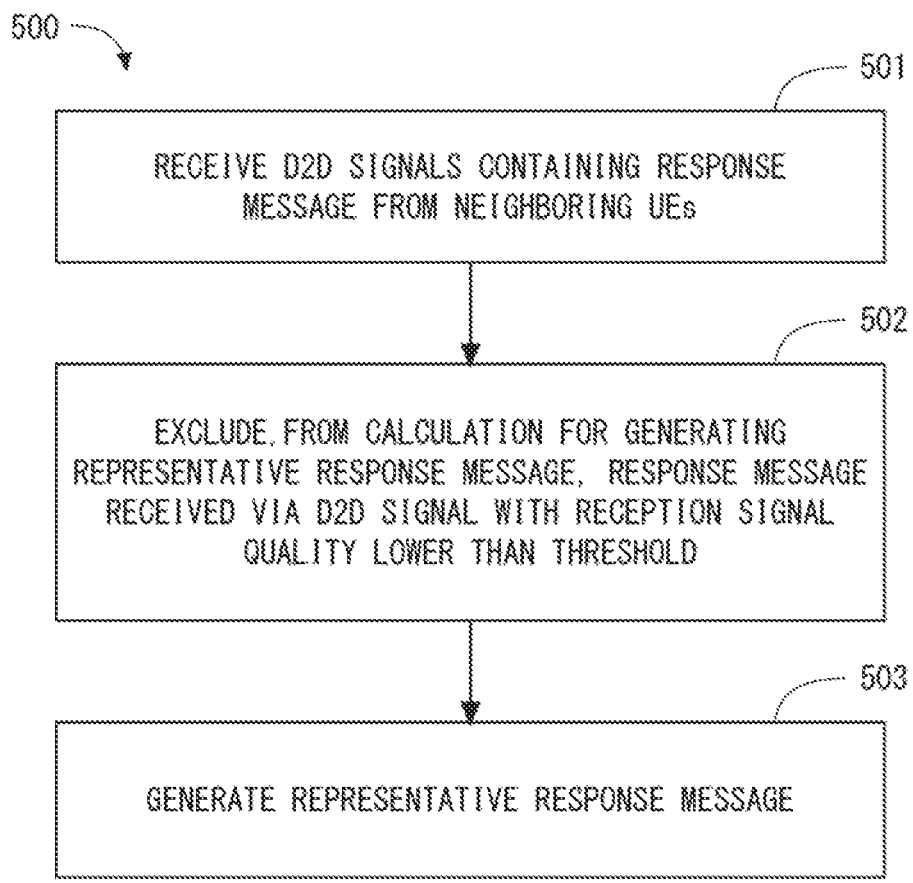
FIG. 5 is a flowchart showing an example of an operation of a radio terminal according to an embodiment.

FIG. 5 is a flowchart showing a process 500 that is an example of an operation of a representative terminal (e.g., radio terminal 1) according to this embodiment. In Step 501, the representative terminal (e.g., radio terminal 1) measures a received signal quality of a D2D signal transmitted from each neighboring radio terminal (e.g., radio terminal 1B or 1C). The D2D signal may be a D2D signal containing a response message or may be another D2D signal.

In Step 502, the representative terminal excludes, from calculation for generating a representative response message, a response message received from a neighboring radio terminal the measured received signal quality of the D2D signal from which is lower than a predetermined first threshold.

In Step 503, a representative response message is generated based on both its response message and the remaining received response messages, except the response message(s) (or neighboring radio terminal(s)) excluded in Step 502.

Instead of Step 502 in FIG. 5, when a measured received signal quality of a D2D signal from a neighboring radio terminal is outside a range between a predetermined lower limit threshold (first threshold) and a predetermined upper limit threshold (second threshold), the representative terminal may exclude a response message received from this neighboring radio terminal from the calculation for generating the representative response message.

When a received signal quality of a D2D signal transmitted from a neighboring radio terminal and received by the representative terminal is extremely low, there may be a situation where this neighboring radio terminal is located far away from the representative terminal. Alternatively, there may be a situation where this neighboring radio terminal is located inside a building and this representative terminal is located outdoor, or vice versa. Under such situations, the received signal quality of the broadcast/multicast signal 220 at the representative terminal may significantly differ from that at the neighboring radio terminal. The operation for generating a representative response message described with reference to FIG. 5 can exclude a response message generated by a neighboring radio terminal that is likely to have a received signal quality of the broadcast/multicast signal 220 significantly different from that of the representative terminal. This contributes to improving performance of control by the cellular communication network 10 or the server 7 on the broadcast/multicast service.

Third Embodiment

This embodiment provides a specific example of an election procedure (election method) for a representative terminal. Configuration examples of a radio communication network according to this embodiment are similar to those shown in FIGS. 1 and 2.

In some implementations, each radio terminal 1 may determine whether its received signal quality of the broadcast/multicast signal 220 (or another predetermined downlink signal) is better than those at one or more neighboring radio terminals 1. In other words, each radio terminal 1 may determine whether it receives the broadcast/multicast signal 220 (or another predetermined downlink signal) from the cellular communication network 10 more satisfactorily than one or more neighboring radio terminals 1 do. That is, each radio terminal 1 autonomously performs the determination. When its received signal quality of the broadcast/multicast signal 220 (or another predetermined downlink signal) is better than those of the neighboring radio terminals 1, the radio terminal 1 recognizes that it has been elected as the representative terminal.

By following this election procedure for a representative terminal, the representative terminal is expected to be more satisfactory than other neighboring radio terminals to communicate with the cellular communication network 10. It is thus, for example, possible to reduce the radio resources required to transmit a representative response message. Additionally or alternatively, it is possible to improve the transmission throughput of a representative response message. Additionally or alternatively, it is possible to effectively prevent a transmission failure of a representative response message.

Each radio terminal 1 may further consider respective remaining battery levels of the radio terminals 1 to elect a representative terminal. To be specific, each radio terminal 1 may elect a representative terminal based on the respective received signal qualities of the broadcast/multicast signal 220 (or another predetermined downlink signal) at the radio terminals 1 and the respective remaining battery levels of the radio terminals 1. In order to enable this election procedure, the response message transmitted in D2D transmission by each radio terminal 1 may further indicate the remaining battery level of the radio terminal 1.

Each radio terminal 1 may be defined by the following Formulas (1) and (2):

$$(\operatorname*{argmax}_{k}) f(k); \quad (1)$$

$$f(k) = w \frac{Q_k}{Q_{MAX}} + (1-w) \frac{C_k}{C_{MAX}}, \quad (2)$$

where $Q_{MAX}$ is the best downlink received signal quality among the downlink received signal qualities ($Q_k$) of the radio terminals 1, $C_{MAX}$ is the maximum value of the remaining battery levels ($C_k$) of the radio terminals 1, and w is a weight coefficient between 0 and 1. The arg max operator in Formula (1) selects the radio terminal corresponding to the maximum value of the function f(k) defined by Formula (2). In other words, Formula (1) elects, as the representative terminal, the radio terminal corresponding to the maximum value of the function F(k), which considers both the downlink received signal quality and the remaining battery level.

Consideration of the remaining battery levels in the election of the representative terminal can contribute to leveling battery consumptions of the plurality of radio terminals 1.

Fourth Embodiment

This embodiment provides a specific example of a transmission timing of a D2D signal by each radio terminal 1. Configuration examples of a radio communication network according to this embodiment are similar to those shown in FIGS. 1 and 2.

Figure 6:
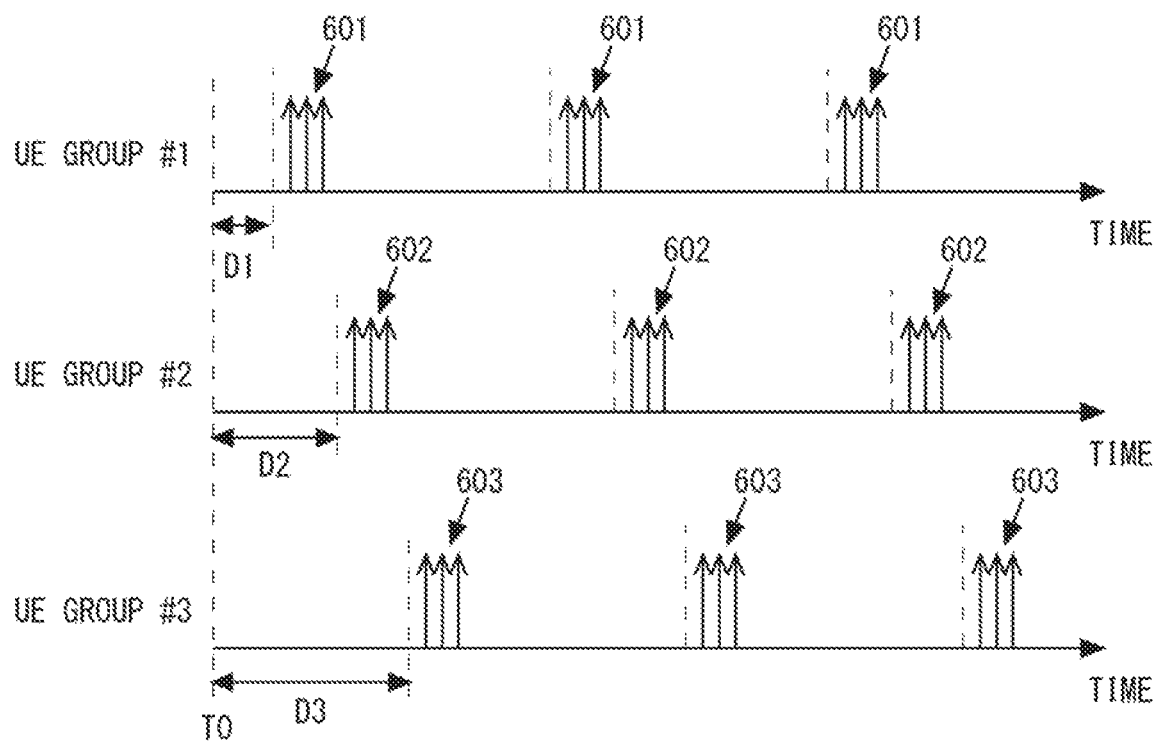
FIG. 6 is a diagram for describing an example of D2D transmission timings of a radio terminal according to an embodiment.

FIG. 6 shows D2D signal transmission timings of a plurality of terminal groups. Each terminal group includes a plurality of radio terminals 1 (e.g., radio terminals 1A, 1B, and 1C).

In the example of FIG. 6, Terminal group (UE group) #1 transmits D2D signals at transmission timings 601. Terminal group (UE group) #2 transmits D2D signals at transmission timings 602. Terminal group (UE group) #3 transmits D2D signals at transmission timings 603.

That is, the transmission timings of each terminal group are adjusted to be different from the timings where the other terminal groups transmit D2D signals. It is thus possible to avoid shortage of D2D radio resources for transmitting D2D signals.

In one example, as shown in FIG. 6, the terminal groups use the same transmission periodicity, while they use different transmission phases defined by respective shift amounts D1, D2, and D3 from the reference timing T0. Alternatively, the terminal groups may transmit D2D signals in accordance with different respective transmission periodicities. The different transmission periodicities of the terminal groups may be defined in such a way that they are mutually prime. Alternatively, the different transmission periodicities of the terminal groups may be defined in such a way that their least common multiple is as large as possible.

Each radio terminal 1 may receive configuration information specifying the transmission timing of D2D signals from the cellular communication network 10. Alternatively, each radio terminal 1 may autonomously determine the transmission timing of D2D signals. For example, each radio terminal may derive the transmission timing of D2D signals for the terminal group to which it belongs, by using an identifier of this terminal group.

Fifth Embodiment

This embodiment provides a procedure for urgently transmitting a representative response message. Configuration examples of a radio communication network according to this embodiment are similar to those shown in FIGS. 1 and 2.

Figure 7:
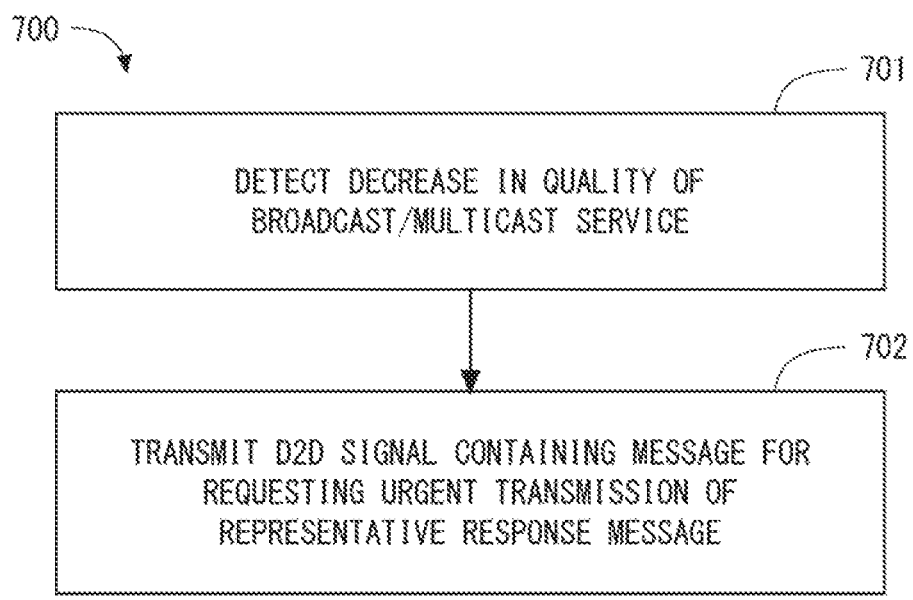
FIG. 7 is a flowchart showing an example of an operation of a radio terminal according to an embodiment.

FIG. 7 is a flowchart showing a process 700 that is an example of an operation of a non-representative terminal. In Step 701, a non-representative terminal detects a decrease in a quality of the broadcast/multicast service. The non-representative terminal may detect a decrease in a received signal quality of the broadcast/multicast signal 220 or another downlink signal.

In Step 702, in response to the detection of a decrease in the quality of the broadcast/multicast service, the non-representative terminal transmits a D2D signal containing a message (hereinafter referred to as an urgent transmission request) for requesting urgent transmission of a representative response message.

Figure 8:
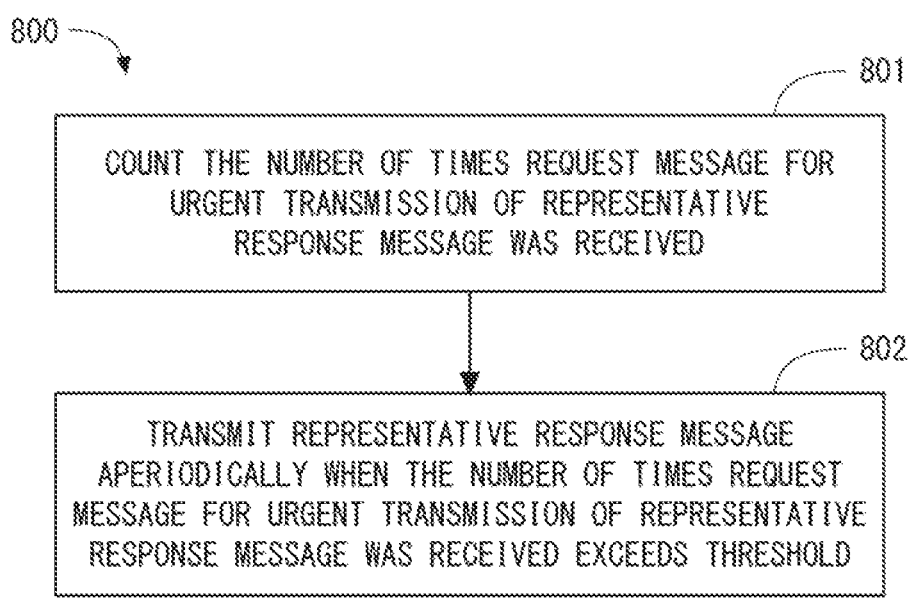
FIG. 8 is a flowchart showing an example of an operation of a radio terminal according to an embodiment.

FIG. 8 is a flowchart showing a process 800 that is an example of an operation of a representative terminal. In Step 801, the representative terminal counts the number of times the urgent transmission request was received. In Step 802, the representative terminal urgently transmits a representative response message to the cellular communication network 10 when the number of times the urgent transmission request was received exceeds a predetermined threshold. The representative terminal may transmit a representative response message aperiodically, i.e., without conforming to a predetermined transmission periodicity.

In some implementations, transmission of a representative response message may be performed in association with (re-)election of the representative terminal. In this case, the above-described urgent transmission request may trigger initiation of a procedure for re-electing the representative terminal. The representative terminal may start the re-election procedure of the representative terminal when the number of times the urgent transmission request was received exceeds a predetermined threshold. The representative terminal may transmit (or broadcast) a D2D signal informing the neighboring radio terminals 1 (non-representative terminals) of the start of the re-election procedure.

By using the urgent transmission procedure of the representative response message described in this embodiment, it is possible to enable the network 10 or the server 7 to perform control to handle a sudden decrease in the quality of the broadcast/multicast service at any of the radio terminals 1.

Figure 9:
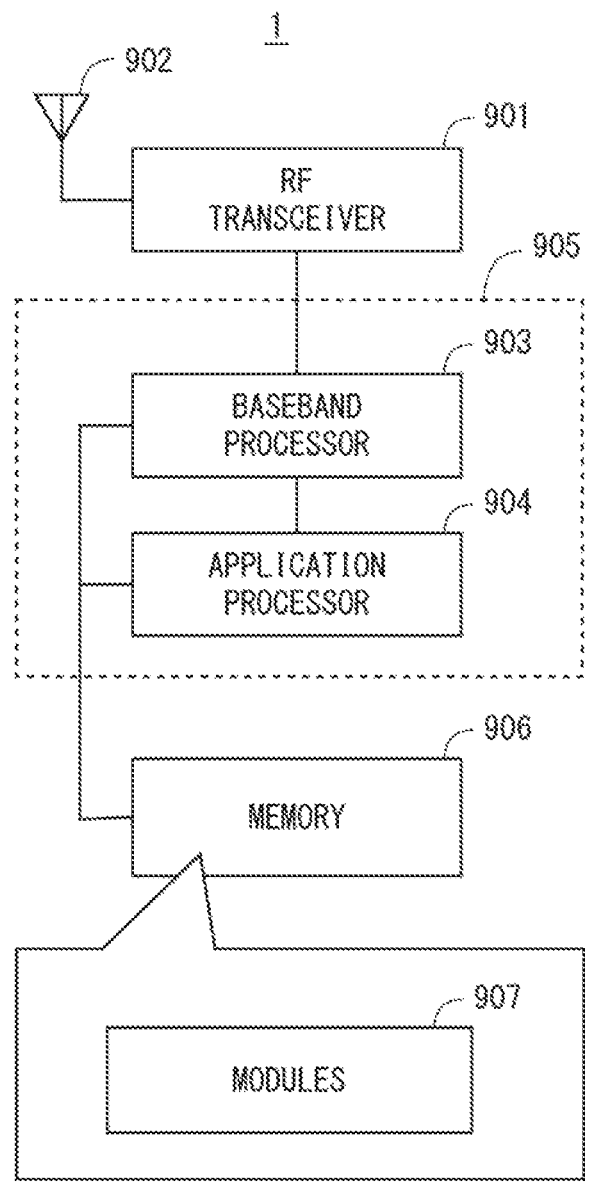
FIG. 9 is a block diagram showing a configuration example of a radio terminal according to an embodiment.

Next, configuration examples of the radio terminal 1 and the base station 2 according to the above embodiments will be described. FIG. 9 is a block diagram showing a configuration example of the radio terminal 1. A Radio Frequency (RF) transceiver 901 performs analog RF signal processing to communicate with the base station 2. The analog RF signal processing performed by the RF transceiver 901 includes frequency up-conversion, frequency down-conversion, and amplification. The RF transceiver 901 is coupled to an antenna 902 and a baseband processor 903. That is, the RF transceiver 901 receives modulation symbol data (or OFDM symbol data) from the baseband processor 903, generates a transmission RF signal, and supplies the transmission RF signal to the antenna 902. Moreover, the RF transceiver 901 generates a baseband reception signal based on a reception RF signal received by the antenna 902 and supplies the baseband reception signal to the baseband processor 903.

The RF transceiver 901 may also be used for D2D communication. The RF transceiver 901 may include a plurality of transceivers including a transceiver used for downlink and uplink with the cellular communication network 10 and a transceiver used for D2D communication among a plurality of radio terminals 1.

The baseband processor 903 performs digital baseband signal processing (data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of the layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE and LTE-Advanced, for example, the digital baseband signal processing performed by the baseband processor 903 may include signal processing of the Packet Data Convergence Protocol (PDCP) layer, Radio Link Control (RLC) layer, Medium Access Control (MAC) layer, and physical (PHY) layer. Further, the control-plane processing performed by the baseband processor 903 may include the processing of the Non-Access Stratum (NAS) protocol, Radio Resource Control (RRC) protocol, and MAC Control Elements (MAC CEs).

The baseband processor 903 may include a modem processor (e.g., Digital Signal Processor (DSP)) that performs the digital baseband signal processing and a protocol stack processor (e.g., Central Processing Unit (CPU) or Micro Processing Unit (MPU)) that performs the control-plane processing. In this case, the protocol stack processor, which performs the control-plane processing, may be integrated with an application processor 904 described in the following.

The application processor 904 may also be referred to as a CPU, an MPU, a microprocessor, or a processor core. The application processor 904 may include a plurality of processors (processor cores). The application processor 904 loads a system software program (Operating System (OS)) and various application programs (e.g., a voice call application, a WEB browser, a mailer, a camera operation application, music reproduction application) from a memory 906 or from another memory (not shown) and executes these programs, thereby providing various functions of the radio terminal 1.

In some implementations, as represented by the dashed line (905) in FIG. 9, the baseband processor 903 and the application processor 904 may be integrated on a single chip. In other words, the baseband processor 903 and the application processor 904 may be implemented in a single System on Chip (SoC) device 905. A SoC device may be referred to as a system Large Scale Integration (LSI) or a chipset.

The memory 906 is a volatile memory or a non-volatile memory or a combination thereof. The memory 906 may include a plurality of physically independent memory devices. The volatile memory is, for example, Static Random Access Memory (SRAM), Dynamic RAM (DRAM) or a combination thereof. The non-volatile memory may be Mask Read Only Memory (MROM), an Electrically Erasable Programmable ROM (EEPROM), a flash memory, a hard disk drive, or any combination thereof. The memory 906 may include, for example, an external memory device that can be accessed from the baseband processor 903, the application processor 904, or the SoC 905. The memory 906 may include an internal memory device integrated within the baseband processor 903, the application processor 904, or the SoC 905. Further, the memory 906 may include a memory in a Universal Integrated Circuit Card (UICC).

The memory 906 may store one or more software modules (computer programs) including instructions and data for processing by the radio terminal 1 described in the above embodiments. In some implementations, the baseband processor 903 or the application processor 904 may load the software modules from the memory 906 and execute the loaded software modules, thereby performing the processing of the radio terminal 1 described in the above embodiments with reference to the drawings.

Figure 10:
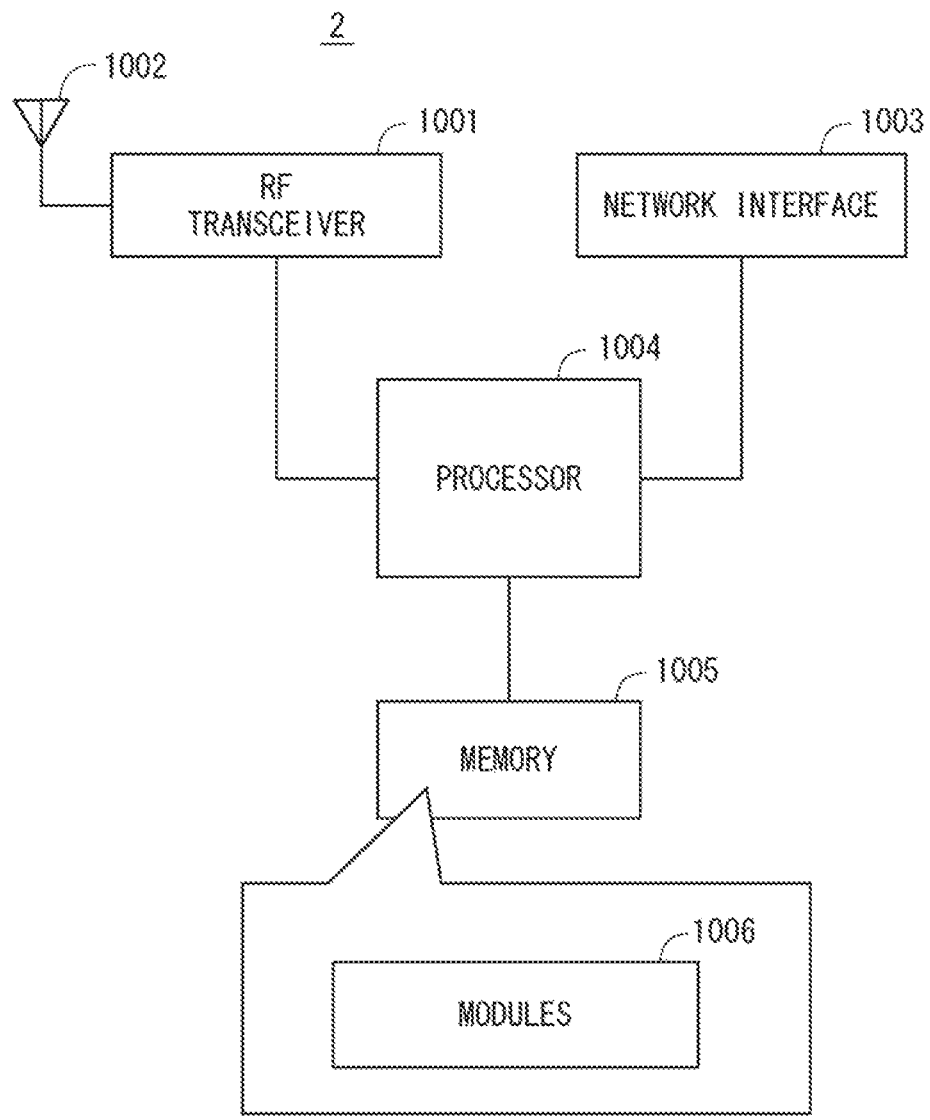
FIG. 10 is a block diagram showing a configuration example of a base station according to an embodiment.

FIG. 10 is a block diagram showing a configuration example of the base station 2 according to the above embodiments. Referring to FIG. 10, the base station 2 includes an RF transceiver 1001, a network interface 1003, a processor 1004, and a memory 1005. The RF transceiver 1001 performs analog RF signal processing to communicate with the radio terminal 1. The RF transceiver 1001 may include a plurality of transceivers. The RF transceiver 1001 is coupled to an antenna 1002 and a processor 1004. The RF transceiver 1001 receives modulation symbol data (or OFDM symbol data) from the processor 1004, generates a transmission RF signal, and supplies the transmission RF signal to the antenna 1002. Moreover, the RF transceiver 1001 generates a baseband reception signal based on a reception RF signal received by the antenna 1002 and supplies a baseband reception signal to the processor 1004.

The network interface 1003 is used to communicate with network nodes (e.g., Mobility Management Entity (MME) and Serving Gateway (S-GW)). The network interface 1003 may include, for example, a network interface card (NIC) conforming to the IEEE 802.3 series.

The processor 1004 performs digital baseband signal processing (data-plane processing) and control-plane processing for radio communication. In the case of LTE and LTE-Advanced, for example, the digital baseband signal processing performed by the processor 1004 may include signal processing of the PDCP layer, RLC layer, MAC layer, and PHY layer. Further, the control-plane processing performed by the processor 1004 may include the processing of the S1 protocol, RRC protocol, and MAC CE.

The processor 1004 may include a plurality of processors. For example, the processor 1004 may include a modem processor (e.g., DSP) that performs the digital baseband signal processing and a protocol stack processor (e.g., CPU or MPU) that performs the control-plane processing.

The memory 1005 is a volatile memory or a non-volatile memory or a combination thereof. The volatile memory is, for example, SRAM, DRAM or a combination thereof. The non-volatile memory may be MROM, a PROM, a flash memory, a hard disk drive, or any combination thereof. The memory 1005 may include a storage located separately from the processor 1004. In this case, the processor 1004 may access the memory 1005 via the network interface 1003 or an I/O interface (not shown).

The memory 1005 may store one or more software modules (computer programs) including instructions and data for processing by the base station 2 described in the above embodiments. In some implementations, the processor 1004 may load the software modules from the memory 1005 and execute the loaded software modules, thereby performing the processing of the base station 2 described in the above embodiments with reference to the drawings in the above embodiments.

As described with reference to FIGS. 9 and 10, each of the processors included in the radio terminal 1 and the base station 2 according to the above-described embodiments includes one or more programs including instructions for causing a computer to execute the algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory (RAM)). These programs may be provided to a computer using any type of transitory computer readable media. Examples of transitory computer readable media include electric signals, optical signals, and electromagnetic waves. Transitory computer readable media can be used to provide programs to a computer via a wired communication line (e.g., electric wires and optical fibers) or a wireless communication line.

Other Embodiments

Each of the above embodiments may be used individually, or two or more of the embodiments may be appropriately combined with one another.

The above-described embodiments are merely examples of applications of the technical ideas obtained by the inventors. These technical ideas are not limited to the above-described embodiments and various modifications can be made thereto.

The whole or part of the above embodiments can be described as, but not limited to, the following supplementary notes.

(Supplementary Note 1)

A radio terminal apparatus comprising:

at least one radio transceiver; and at least one processor configured to:

receive a broadcast/multicast signal via downlink reception from a cellular communication network by means of the at least one radio transceiver, the broadcast/multicast signal being transmitted from the cellular communication network;

receive at least one response message via device-to-device (D2D) communication by means of the at least one radio transceiver, the at least one response message being transmitted from at least one respective neighboring radio terminal based on reception of the broadcast/multicast signal by the at least one neighboring radio terminal;

generate a representative response message based on both a result of receiving the broadcast/multicast signal and a result of receiving the at least one response message via the at least one radio transceiver; and transmit the representative response message to the cellular communication network or another node, via uplink transmission to the cellular communication network by means of the at least one radio transceiver.

(Supplementary Note 2)

The radio terminal apparatus according to Supplementary Note 1, wherein the at least one processor is configured to:

measure a received signal quality of a D2D signal transmitted from each neighboring radio terminal; and exclude, from calculation for generating the representative response message, a response message received from a neighboring radio terminal the received signal quality of which is lower than a predetermined threshold.

(Supplementary Note 3)

The radio terminal apparatus according to Supplementary Note 1 or 2, wherein each of the at least one response message indicates a received signal quality of the broadcast/multicast signal or another predetermined downlink signal at each neighboring radio terminal, and the representative response message indicates at least one statistical value obtained from the received signal quality measured by the at least one neighboring radio terminal.

(Supplementary Note 4)

The radio terminal apparatus according to Supplementary Note 3, wherein the at least one statistical value includes at least one of: a minimum value; a maximum value; an average value; or a variance value.

(Supplementary Note 5)

The radio terminal apparatus according to Supplementary Note 4, wherein the at least one statistical value includes at least the minimum value.

(Supplementary Note 6)

The radio terminal apparatus according to Supplementary Note 1 or 2, wherein each of the at least one response message indicates a received signal quality of the broadcast/multicast signal or another predetermined downlink signal at each neighboring radio terminal, and the representative response message indicates the received signal quality of each of the at least one neighboring radio terminal.

(Supplementary Note 7)

The radio terminal apparatus according to any one of Supplementary Notes 1 to 6, wherein the broadcast/multicast signal is a downlink radio channel for transmitting a data radio bearer that carries a Multimedia Broadcast/Multicast Service (MBMS).

(Supplementary Note 8)

The radio terminal apparatus according to any one of Supplementary Notes 1 to 7, wherein the at least one processor is configured to execute a procedure for electing a representative terminal to transmit the representative response message on behalf of the at least one neighboring radio terminal, wherein the procedure includes determining whether a received signal quality of the broadcast/multicast signal or another predetermined downlink signal at the radio terminal apparatus is better than that at the at least one neighboring radio terminal.

(Supplementary Note 9)

The radio terminal apparatus according to any one of Supplementary Notes 1 to 7, wherein the at least one processor is configured to execute a procedure for determining a representative terminal to transmit the representative response message on behalf of the at least one neighboring radio terminal, wherein the procedure includes determining the representative terminal based on both a received signal quality of the broadcast/multicast signal or another predetermined downlink signal at each radio terminal and a remaining battery level of each radio terminal.

(Supplementary Note 10)

The radio terminal apparatus according to any one of Supplementary Notes 1 to 9, wherein the at least one processor is configured to, in response to receiving from one or more of the at least one neighboring radio terminal a first message for requesting urgent transmission of the representative response message, transmit the representative response message without conforming to a predetermined transmission periodicity of the representative response message.

(Supplementary Note 11)

The radio terminal apparatus according to Supplementary Note 10, wherein the at least one processor is configured to count a number of times the first message was received and to transmit the representative response message aperiodically when the number of times the first message was received exceeds a predetermined value.

(Supplementary Note 12)

The radio terminal apparatus according to Supplementary Note 10, wherein the first message triggers initiation of a procedure for re-electing the representative terminal to transmit the representative response message on behalf of the at least one neighboring radio terminal.

(Supplementary Note 13)

The radio terminal apparatus according to Supplementary Note 12, wherein the at least one processor is configured to count a number of times the first message was received and to start the procedure for re-electing the representative terminal when the number of times the first message was received exceeds a predetermined value.

(Supplementary Note 14)

A radio terminal apparatus comprising:

at least one radio transceiver; and at least one processor configured to:

receive a broadcast/multicast signal via downlink reception from a cellular communication network by means of the at least one radio transceiver, the broadcast/multicast signal being transmitted from the cellular communication network;

generate a response message based on reception of the broadcast/multicast signal; and
transmit a device-to-device (D2D) signal, containing the response message, to at least one neighboring radio terminal via D2D communication by means of the at least one radio transceiver.

(Supplementary Note 15)

The radio terminal apparatus according to Supplementary Note 14, wherein the response message is used by a representative terminal included in the at least one neighboring radio terminal to generate a representative response message, and the representative response message is transmitted by the representative terminal to the cellular communication network or another node via uplink transmission to the cellular communication network.

(Supplementary Note 16)

The radio terminal apparatus according to Supplementary Note 15, wherein the at least one processor is configured to, in response to detecting a decrease in a received signal quality of the broadcast/multicast signal or another predetermined downlink signal, transmit via the D2D communication a first message for requesting urgent transmission of the representative response message.

(Supplementary Note 17)

The radio terminal apparatus according to Supplementary Note 16, wherein the first message triggers initiation of a procedure for re-electing the representative terminal.

(Supplementary Note 18)

The radio terminal apparatus according to any one of Supplementary Notes 14 to 17, wherein the response message indicates a received signal quality of the broadcast/multicast signal or another predetermined downlink signal.

(Supplementary Note 19)

The radio terminal apparatus according to Supplementary Note 18, wherein the response message further indicates a remaining battery level of the radio terminal apparatus.

(Supplementary Note 20)

The radio terminal apparatus according to any one of Supplementary Notes 14 to 19, wherein the D2D signal is transmitted in a discovery procedure for discovering a neighboring radio terminal.

(Supplementary Note 21)

The radio terminal apparatus according to any one of Supplementary Notes 14 to 20, wherein the at least one processor is configured to transmit the D2D signal at a transmission timing permitted for a terminal group to which the radio terminal apparatus belongs, wherein the transmission timing is adjusted in such a way that the transmission timing differs from a timing where a D2D signal is transmitted by another terminal group.

(Supplementary Note 22)

The radio terminal apparatus according to Supplementary Note 21, wherein the at least one processor is configured to receive, from the cellular communication network, configuration information specifying the transmission timing.

(Supplementary Note 23)

The radio terminal apparatus according to any one of Supplementary Notes 14 to 22, wherein the broadcast/multicast signal is a downlink radio channel for transmitting a data radio bearer that carries a Multimedia Broadcast/Multicast Service (MBMS).

(Supplementary Note 24)

A method performed by a radio terminal apparatus, the method comprising:

receiving a broadcast/multicast signal via downlink reception from a cellular communication network by means of at least one radio transceiver of the radio terminal apparatus, the broadcast/multicast signal being transmitted from the cellular communication network;

receiving at least one response message via device-to-device (D2D) communication by means of the at least one radio transceiver, the at least one response message being transmitted from at least one respective neighboring radio terminal based on reception of the broadcast/multicast signal by the at least one neighboring radio terminal;

generating a representative response message based on both a result of receiving the broadcast/multicast signal and a result of receiving the at least one response message via the at least one radio transceiver; and transmitting the representative response message to the cellular communication network or another node, via uplink transmission to the cellular communication network by means of the at least one radio transceiver.

(Supplementary Note 25)

A method performed by a radio terminal apparatus, the method comprising:

receiving a broadcast/multicast signal via downlink reception from a cellular communication network by means of at least one radio transceiver of the radio terminal apparatus, the broadcast/multicast signal being transmitted from the cellular communication network;

generating a response message based on reception of the broadcast/multicast signal; and transmitting a device-to-device (D2D) signal, containing the response message, to at least one neighboring radio terminal via D2D communication by means of the at least one radio transceiver.

(Supplementary Note 26)

A non-transitory computer readable medium storing a program for causing a computer to perform a method for a radio terminal apparatus, the method comprising:

receiving a broadcast/multicast signal via downlink reception from a cellular communication network by means of at least one radio transceiver of the radio terminal apparatus, the broadcast/multicast signal being transmitted from the cellular communication network;

receiving at least one response message via device-to-device (D2D) communication by means of the at least one radio transceiver, the at least one response message being transmitted from at least one respective neighboring radio terminal based on reception of the broadcast/multicast signal by the at least one neighboring radio terminal;

generating a representative response message based on both a result of receiving the broadcast/multicast signal and a result of receiving the at least one response message via the at least one radio transceiver; and transmitting the representative response message to the cellular communication network or another node, via uplink transmission to the cellular communication network by means of the at least one radio transceiver.

(Supplementary Note 27)

A non-transitory computer readable medium storing a program for causing a computer to perform a method for a radio terminal apparatus, the method comprising:

receiving a broadcast/multicast signal via downlink reception from a cellular communication network by means of at least one radio transceiver of the radio terminal apparatus, the broadcast/multicast signal being transmitted from the cellular communication network;

generating a response message based on reception of the broadcast/multicast signal; and transmitting a device-to-device (D2D) signal, containing the response message, to at least one neighboring radio terminal via D2D communication by means of the at least one radio transceiver.

(Supplementary Note 28)

A base station used in a cellular communication network, the base station comprising:
   at least one radio transceiver; and
   at least one processor configured to:
   transmit a broadcast/multicast signal to a plurality of radio terminals via downlink transmission by means of at least one radio transceiver; and
   receive a representative response message from a representative terminal of the plurality of radio terminals via uplink reception by means of the at least one radio transceiver, wherein
   the representative message is generated by the representative terminal, in response to receiving at least one response message via device-to-device (D2D) communication, based on both a result of receiving the broadcast/multicast signal by the representative terminal and a result of receiving the at least one response message, wherein the at least one response message is transmitted from at least one respective neighboring radio terminal based on reception by the at least one neighboring radio terminal of the broadcast/multicast signal.

(Supplementary Note 29)

A method in a base station used in a cellular communication network, the method comprising:
   transmitting a broadcast/multicast signal to a plurality of radio terminals via downlink transmission by means of the at least one radio transceiver; and
   receiving a representative response message from a representative terminal of the plurality of radio terminals via uplink reception by means of the at least one radio transceiver, wherein
   the representative message is generated by the representative terminal, in response to receiving at least one response message via device-to-device (D2D) communication, based on both a result of receiving the broadcast/multicast signal by the representative terminal and a result of receiving the at least one response message, wherein the at least one response message is transmitted from at least one respective neighboring radio terminal based on reception by the at least one neighboring radio terminal of the broadcast/multicast signal.

(Supplementary Note 30)

A non-transitory computer readable medium storing a program for causing a computer to perform a method for a base station used in a cellular communication network, the method comprising:
   transmitting a broadcast/multicast signal to a plurality of radio terminals via downlink transmission by means of the at least one radio transceiver; and
   receiving a representative response message from a representative terminal of the plurality of radio terminals via uplink reception by means of the at least one radio transceiver, wherein the representative message is generated by the representative terminal, in response to receiving at least one response message via device-to-device (D2D) communication, based on both a result of receiving the broadcast/multicast signal by the representative terminal and a result of receiving the at least one response message, wherein the at least one response message is transmitted from at least one respective neighboring radio terminal based on reception by the at least one neighboring radio terminal of the broadcast/multicast signal.

The present application is based upon and claims the benefit of priority from Japanese Patent Application No. 2017-086989, filed on Apr. 26, 2017, the entire contents of which are hereby incorporated by reference.

REFERENCE SIGNS LIST

1 RADIO TERMINAL
2 BASE STATION
3 D2D CONTROLLER
7 SERVER
10 CELLULAR COMMUNICATION NETWORK
21 CELLULAR COVERAGE

What is claimed is:

1. A radio terminal apparatus comprising:
at least one radio transceiver; and
at least one processor configured to:
   receive a broadcast/multicast signal via downlink reception from a cellular communication network by means of the at least one radio transceiver, the broadcast/multicast signal being transmitted from the cellular communication network;
   receive at least one response message via device-to-device (D2D) communication by means of the at least one radio transceiver, the at least one response message being transmitted from at least one respective neighboring radio terminal based on reception of the broadcast/multicast signal by the at least one neighboring radio terminal;
   generate a representative response message based on both a result of receiving the broadcast/multicast signal and a result of receiving the at least one response message via the at least one radio transceiver; and
   transmit the representative response message to the cellular communication network or another node, via uplink transmission to the cellular communication network by means of the at least one radio transceiver,
wherein the at least one processor is further configured to, in response to receiving from one or more of the at least one neighboring radio terminal a first message for requesting urgent transmission of the representative response message, transmit the representative response message without conforming to a predetermined transmission periodicity of the representative response message.

2. The radio terminal apparatus according to claim 1, wherein the at least one processor is configured to count a number of times the first message was received and to transmit the representative response message aperiodically when the number of times the first message was received exceeds a predetermined value.

3. The radio terminal apparatus according to claim 1, wherein the first message triggers initiation of a procedure for re-electing the representative terminal to transmit the representative response message on behalf of the at least one neighboring radio terminal.

4. The radio terminal apparatus according to claim 3, wherein the at least one processor is configured to count a number of times the first message was received and to start the procedure for re-electing the representative terminal when the number of times the first message was received exceeds a predetermined value.

5. A radio terminal apparatus comprising:
at least one radio transceiver; and
at least one processor configured to:
- receive a broadcast/multicast signal via downlink reception from a cellular communication network by means of the at least one radio transceiver, the broadcast/multicast signal being transmitted from the cellular communication network;
- generate a response message based on reception of the broadcast/multicast signal; and
- transmit a device-to-device (D2D) signal, containing the response message, to at least one neighboring radio terminal via D2D communication by means of the at least one radio transceiver, wherein the response message is used by a representative terminal included in the at least one neighboring radio terminal to generate a representative response message, the representative response message is transmitted by the representative terminal to the cellular communication network or another node via uplink transmission to the cellular communication network, and the at least one processor is further configured to, in response to detecting a decrease in a received signal quality of the broadcast/multicast signal or another predetermined downlink signal, transmit via the D2D communication a first message for requesting urgent transmission of the representative response message.

6. The radio terminal apparatus according to claim 5, wherein the first message triggers initiation of a procedure for re-electing the representative terminal.

7. A method performed by a radio terminal apparatus, the method comprising:
- receiving a broadcast/multicast signal via downlink reception from a cellular communication network by means of at least one radio transceiver of the radio terminal apparatus, the broadcast/multicast signal being transmitted from the cellular communication network;
- receiving at least one response message via device-to-device (D2D) communication by means of the at least one radio transceiver, the at least one response message being transmitted from at least one respective neighboring radio terminal based on reception of the broadcast/multicast signal by the at least one neighboring radio terminal;
- generating a representative response message based on both a result of receiving the broadcast/multicast signal and a result of receiving the at least one response message via the at least one radio transceiver; and
- transmitting the representative response message to the cellular communication network or another node, via uplink transmission to the cellular communication network by means of the at least one radio transceiver, wherein the method further comprises, in response to receiving from one or more of the at least one neighboring radio terminal a first message for requesting urgent transmission of the representative response message, transmitting the representative response message without conforming to a predetermined transmission periodicity of the representative response message.

8. A method performed by a radio terminal apparatus, the method comprising:
- receiving a broadcast/multicast signal via downlink reception from a cellular communication network by means of at least one radio transceiver of the radio terminal apparatus, the broadcast/multicast signal being transmitted from the cellular communication network;
- generating a response message based on reception of the broadcast/multicast signal; and
- transmitting a device-to-device (D2D) signal, containing the response message, to at least one neighboring radio terminal via D2D communication by means of the at least one radio transceiver, wherein the response message is used by a representative terminal included in the at least one neighboring radio terminal to generate a representative response message, the representative response message is transmitted by the representative terminal to the cellular communication network or another node via uplink transmission to the cellular communication network, and the method further comprises, in response to detecting a decrease in a received signal quality of the broadcast/multicast signal or another predetermined downlink signal, transmitting via the D2D communication a first message for requesting urgent transmission of the representative response message.

\* \* \* \* \*